Jan. 25, 1944.  A. R. RUSSELL  2,340,227
FLUORESCENT GLOW SHEET AND THE METHOD OF MANUFACTURING THE SAME
Filed May 15, 1942

INVENTOR.
ALFRED R. RUSSELL
BY
ATTORNEY

Patented Jan. 25, 1944

2,340,227

UNITED STATES PATENT OFFICE 2,340,227

FLUORESCENT GLOW SHEET AND THE METHOD OF MANUFACTURING THE SAME

Alfred R. Russell, Grosse Pointe, Mich., assignor to The Burkhardt Company, a corporation of Michigan Application May 15, 1942, Serial No. 443,161

11 Claims. (Cl. 40—134)

This invention relates to improved thermoplastic fluorescent glow sheets and deals with an improved fusion method of manufacturing glow sheets, bombardier charts, dials, computers, and the like from thermoplastic stock.

One object of this invention is to provide improved ultra violet ray responsive thermoplastic products such as glow sheets, bombardier charts, dials, computers, and the like wherein the fluorescent copy becomes substantially integral with the thermoplastic sheet whereby to assure durability, high quality, high luminosity, and permanency of the fluorescent qualities of the product.

Another object of the invention is to provide a simple, effective and economical method of manufacturing thermoplastic ultra violet ray responsive products of the type hereinbefore mentioned which assures the highest quality and permanency of the products.

Other objects of the invention will become apparent by reference to the following detailed description taken in connection with the accompanying drawing, in which.

Figure 1:
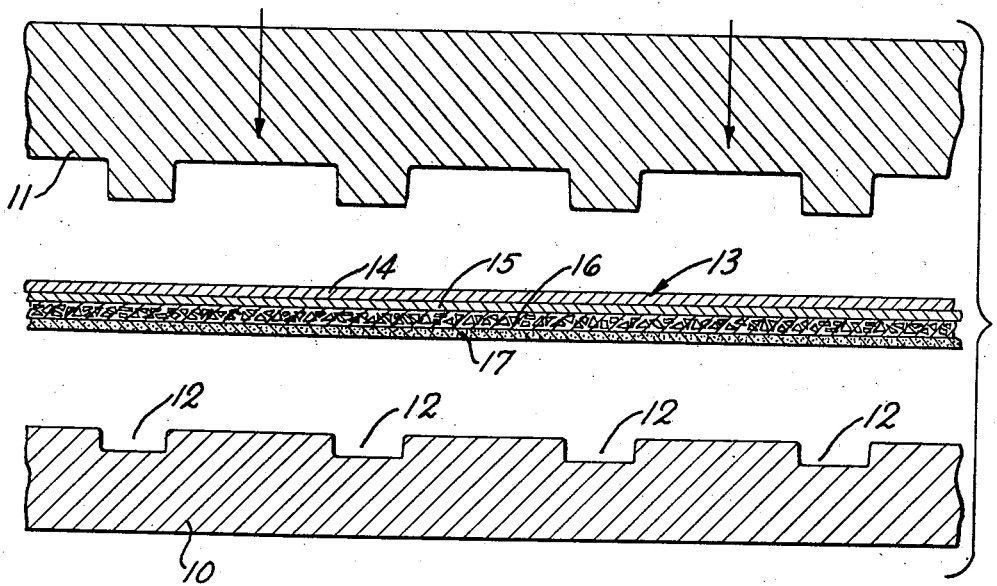
Fig. 1 is a greatly enlarged cross sectional view through a plastic sheet, transfer and die indicating the method of manufacturing ultra violet ray responsive products hereunder.

Referring now to the drawing wherein like numerals refer to like and corresponding parts throughout the several views, Fig. 1 shows a thermoplastic base sheet 10 which has been debossed with a hot debossing die 11 forming therein cavities or depressions 12 which are of the outline of the copy to be embedded in the base sheet 10. The depth of the depression or copy 12 is preferably from 1 to 7 thousandths of an inch.

Figure 3:
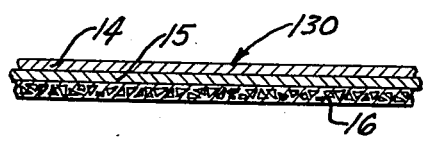
Fig. 3 is a greatly enlarged cross sectional view through an alternate transfer which may be employed.

A transfer sheet 13 composed of a Cellophane or other carrying sheet 14 preferably wax coated at 15 upon which a layer of fluorescent pigment preferably of the zinc sulphide or cadmium sulphide type mixed in a thermoplastic liquid such as acryloid or plasticized ethyl cellulose 16 is sprayed or roll coated until the said layer becomes 1 to 7 thousandths of an inch thick. A coating 17 of thermoplastic material of approximately the same melting point as the thermoplastic base sheet 10 may be placed over (under as viewed in Fig. 1) the pigmented thermoplastic layer 16, however, as indicated in Fig. 3, the transfer sheet 130 does not employ the coating 17; it having been found that with some combinations of thermoplastic materials, the coating 17 is unnecessary. The transfer sheets 13 or 130, whichever employed, are preferably prepared with the Cellophane sheet 14 down and later turned over as indicated in Figs. 1 and 3 before the transfer operation in the manufacture of fluorescent glow sheets and the like.

After the transfer sheet 13 or 130 is prepared, it is placed, Cellophane side up, on the debossed base sheet 10. The hot debossing die 11 is then moved against the transfer sheet 13 and forces the same into the cavities or depressions 12 in the base sheet 10 whereupon the heat melts the wax layer 15 and causes the fluorescent pigment carrying thermoplastic layer 16 and the thermoplastic coating 17, if the transfer sheet 13 is used, to transfer to and fuse with the base sheet 10. Only those portions of the thermoplastic layer 16, and the coating 17 when employed, forced into the debossed areas 12 are removed from the transfer sheet 13 during the operation, the wax layer 15 melting to permit these areas to separate from the carrying sheet 14 and the layers 16 and 17 softening to such an extent as to permit separation of these areas therefrom. When the die 11 is withdrawn the balance of the sheet 13 remaining is removed.

Figure 2:
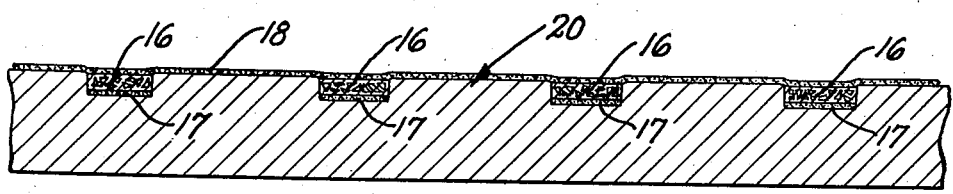
Fig. 2 is a greatly enlarged cross sectional view through a finished glow sheet embodying the invention manufactured in accordance with my improved method.

Fig. 2 shows a completed ultra violet ray responsive glow sheet 20 embodying the invention in the manufacture of which a transfer sheet 13 has been employed. When a transfer sheet 130 is used, the plastic layer 17 is not present in the completed glow sheet. Optionally, the completed glow sheet may have thereover a protective coating or film 18 of ethyl cellulose, acrylic or methyl methacrylate lacquer, or, the protective film 18 may be a thermoplastic sheet not incompatible with the base sheet 10 laminated thereto.

Figure 4:
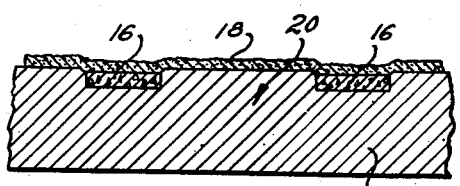
Fig. 4 is a fragmentary, sectional view similar to Fig. 2 but showing a structure made by employing a transfer as shown in Fig. 3 and as having a roughened upper surface.

If it is desired to write in pencil or ink and erase such writing from the finished sheet, a final coating of lacquer like or similar to the protective coating or film 18 and compatible therewith may be sprayed on the protective coating or film 18 under high pressure which produces a toothed surface firmly anchored to the protective coating or film 18 which can be written upon in pencil and ink without destroying the usability of the finished sheet 20. If a thermoplastic sheet is laminated onto the base sheet 10 as a protective film 18, then, the roughened or toothed surface to accommodate writing in pencil or ink on the finished product is accomplished by employing a neat or finely roughened embossing plate in the upper portion of the laminating press. This form of construction is illustrated in Fig. 4 which is similar to Fig. 2 but made by employing the transfer shown in Fig. 3 and except that it is provided with the roughened upper surface referred to. It will be appreciated that such roughened surface may be applied to the type of construction shown in Figs. 1 and 2 equally as well.

Glow sheets, bombardier charts, dials, computers, and the like, manufactured in accordance with the instant invention become substantially an integral unit wherein the fluorescent pigment copy is thoroughly and completely embedded in and becomes substantially integral with the base sheet and protected from the elements, from oxidation, and from other chemical deterioration. Also, a minimum of ultra violet deterioration is found to exist in the completed product. The selection of thermoplastics and lacquers from that class of plastics which have non-fluorescent qualities assures near perfection in the completed product.

Where fluorescent pigments have been specified, it is understood and obvious that phosphorescent or radio active pigments may be substituted. With the exception of the thermoplastic base stock and the thermoplastic protective sheet which is laminated over the completed glow sheet, the other thermoplastic coatings and layers may be classed broadly as "siccative" coatings or inks and are selected for the particular properties herein defined which dry either from evaporation, oxidation, crystalization or polymerization. The term "compatible" is employed herein to designate a coating or material which is not chemically deleterious to adjacent coatings or materials.

Although but one embodiment and one alternate method of practicing the invention have been disclosed herein in detail, it is obvious that many variations in the method steps and in the selection of equivalent materials, phosphorescent pigments, thermoplastics and the like may be made in practicing the invention without departing from the spirit and the scope thereof as defined in the appended claims.

I claim:

1. A glow sheet comprising a thermoplastic base sheet debossed to the form of copy desired thereon, and fluorescent copy composed of a fluorescent pigment dispersed in a transparent thermoplastic resin material fused to said base sheet in the debossed areas thereof.

2. A glow sheet comprising a thermoplastic base sheet debossed to the form of copy desired thereon, fluorescent copy composed of a fluorescent pigment dispersed in a transparent thermoplastic resin material and fused to said base sheet in the debossed areas thereof, and a transparent protective siccative coating compatible with said thermoplastic sheet applied to said base sheet over said fluorescent copy thereon.

3. A glow sheet comprising a thermoplastic base sheet debossed to the form of copy desired thereon, fluorescent copy composed of a fluorescent pigment dispersed in a transparent thermoplastic resin material and fused to said base sheet in the debossed areas thereof, a transparent protective siccative coating compatible with said thermoplastic sheet applied to said base sheet over said fluorescent copy thereon, and a roughened transparent siccative coating like and similar to and compatible with said last mentioned coating applied over that face of the resulting assembly on which said material has been applied providing a writing surface on said glow sheet.

4. A glow sheet comprising a thermoplastic base sheet debossed to the form of copy desired thereon, fluorescent copy composed of a fluorescent pigment dispersed in a transparent thermoplastic resin material and fused to said base sheet in the debossed areas thereof, and a transparent protective thermoplastic sheet laminated over that entire surface of said base sheet to which said material has been applied.

5. A glow sheet comprising a thermoplastic base sheet debossed to the form of copy desired thereon, fluorescent copy composed of a fluorescent pigment dispersed in a transparent thermoplastic resin material and fused to said base sheet in the debossed areas thereof, and a surface roughened protective transparent thermoplastic sheet laminated over that entire surface of said base sheet to which said material has been applied and over said material thereon.

6. The method of manufacturing glow sheets comprising the debossing of a thermoplastic base stock with a heated debossing die to the form of copy desired thereon with a heated debossing die, preparing a transfer composed of a wax coated carrying sheet having on the waxed side thereof a layer of fluorescent pigment dispersed in a siccative thermoplastic, placing said transfer carrying sheet side up over said debossed thermoplastic base stock, and moving the heated debossing die against said transfer whereby to melt the wax layer and fuse the said pigment carrying thermoplastic layer to the said base stock in the copy depressions therein.

7. The method of manufacturing glow sheets comprising the debossing of a thermoplastic base stock with a heated debossing die to the form of copy desired thereon with a heated debossing die, preparing a transfer composed of a wax coated carrying sheet having on the waxed side thereof a layer of fluorescent pigment dispersed in a siccative thermoplastic and a coating of siccative thermoplastic on said pigment carrying thermoplastic layer, placing said transfer carrying sheet side up over said debossed thermoplastic base stock, and moving the heated debossing die against said transfer whereby to melt the wax layer and fuse the said pigment carrying thermoplastic layer and thermoplastic coating to said base stock in the copy depressions therein.

8. The method of manufacturing glow sheets comprising the debossing of a thermoplastic base stock with a heated debossing die to the form of copy desired thereon with a heated debossing die, preparing a transfer composed of a wax coated carrying sheet having on the waxed side thereof a layer of fluorescent pigment dispersed in a siccative thermoplastic, placing said transfer carrying sheet side up over said debossed thermoplastic base stock, moving the heated debossing die against said transfer whereby to melt the wax layer and fuse the said pigment carrying thermoplastic layer to the said base stock in the copy depressions therein, and applying a siccative transparent lacquer protective coating over the entire surface of said sheet to which said material has been applied and over said material thereon.

9. The method of manufacturing glow sheets comprising the debossing of a thermoplastic base stock with a heated debossing die to the form of copy desired thereon with a heated debossing die, preparing a transfer composed of a wax coated carrying sheet having on the waxed side thereof a layer of fluorescent pigment dispersed in a siccative thermoplastic and a coating of siccative thermoplastic on said pigment carrying thermoplastic layer, placing said transfer carrying sheet side up over said debossed thermoplastic base stock, moving the heated debossing die against said transfer whereby to melt the wax layer and fuse the said pigment carrying thermoplastic layer and thermoplastic coating to said base stock in the copy depressions therein, and applying a siccative transparent protective coating having a roughened exterior surface over the entire surface of said sheet to which said material has been applied and over said material thereon.

10. The method of manufacturing glow sheets comprising the debossing of a thermoplastic base stock with a heated debossing die to the form of copy desired thereon with a heated debossing die, preparing a transfer composed of a wax coated carrying sheet having on the waxed side thereof a layer of fluorescent pigment dispersed in a siccative thermoplastic, placing said transfer carrying sheet side up over said debossed thermoplastic base stock, moving the heated debossing die against said transfer whereby to melt the wax layer and fuse the said pigment carrying thermoplastic layer to the said base stock in the copy depressions therein, and heat laminating a thermoplastic transparent sheet over the entire base sheet using a heated finely roughened embossing plate.

11. The method of manufacturing glow sheets comprising the debossing of a thermoplastic base stock with a heated debossing die to the form of copy desired thereon with a heated debossing die, preparing a transfer composed of a wax coated carrying sheet having on the waxed side thereof a layer of fluorescent pigment dispersed in a siccative thermoplastic and a coating of siccative thermoplastic on said pigment carrying thermoplastic layer, placing said transfer carrying sheet side up over said debossed thermoplastic base stock, moving the heated debossing die against said transfer whereby to melt the wax layer and fuse the said pigment carrying thermoplastic layer and thermoplastic coating to said base stock in the copy depressions therein, and heat laminating a thermoplastic transparent sheet over the entire base sheet using a heated finely roughened embossing plate.

ALFRED R. RUSSELL.